(12) United States Patent
Swank et al.

(10) Patent No.: US 7,442,443 B2
(45) Date of Patent: Oct. 28, 2008

(54) CHROMIUM-NICKEL STAINLESS STEEL ALLOY ARTICLE HAVING OXIDE COATING FORMED FROM THE BASE METAL SUITABLE FOR BRAKE APPARATUS

(75) Inventors: John P. Swank, Troy, OH (US); Leslie Steele, Greenville, OH (US); Robert Bianco, Strongsville, OH (US)

(73) Assignee: Goodrich Corporation, Charlotte, NC (US)

( * ) Notice: Subject to any disclaimer, the term of this patent is extended or adjusted under 35 U.S.C. 154(b) by 330 days.

(21) Appl. No.: 11/141,479

(22) Filed: May 31, 2005

(65) Prior Publication Data

US 2006/0269766 A1    Nov. 30, 2006

(51) Int. Cl.
*B32B 15/04* (2006.01)
*F16D 65/00* (2006.01)

(52) U.S. Cl. .................. 428/469; 428/701; 428/702; 188/251 A; 188/251 M; 188/251 R (58) Field of Classification Search ................ 428/469, 428/701, 702; 188/251 A, 251 M, 251 R
See application file for complete search history.

(56) References Cited

U.S. PATENT DOCUMENTS

| | | | |
|---|---|---|---|
| 3,657,061 A | 4/1972 | Carlson et al. | |
| 3,907,076 A | 9/1975 | Crossman et al. | |
| 4,017,336 A | 4/1977 | Foroulis | |
| 4,052,530 A | 10/1977 | Fonzi | |
| 4,469,204 A | 9/1984 | Bok et al. | |
| 4,790,052 A | 12/1988 | Olry | |
| 5,217,770 A | 6/1993 | Morris, Jr. et al. | |
| 5,370,838 A | 12/1994 | Sato et al. | |
| 5,480,678 A | 1/1996 | Rudolph et al. | |
| 5,546,880 A | 8/1996 | Ronyak et al. | |
| 5,662,855 A | 9/1997 | Liew et al. | |
| 5,789,086 A | 8/1998 | Ohmi | |
| 6,037,061 A | 3/2000 | Ohmi | |

(Continued)

OTHER PUBLICATIONS

Corus Engineering Steels, Information Sheet for AMS 5643 / AMS 5622 (17-PH), Jun. 2003.

(Continued)

*Primary Examiner*—John J. Zimmerman
*Assistant Examiner*—Aaron Austin
(74) *Attorney, Agent, or Firm*—Brinks Hofer Gilson & Lione (57) ABSTRACT

Disclosed is a chromium-nickel stainless steel alloy article having an adherent, wear resistant coating of metallic oxides and a method of forming an adherent, wear resistant coating of metallic oxides on a chromium-nickel stainless steel alloy article. The coating desirably has a thickness of from about 25.4 to about 102 microns (1 mil to about 4 mils) and is formed by exposure of the article to an oxidizing atmosphere, preferably air, preferably during heat treatment of the article. Such articles are useful, inter alia, as torque drive inserts for a friction disk for a multi-disk brake or clutch assembly. The drive inserts can be formed of an alloy such as 17-4PH stainless steel alloy having an adherent coating of lubricious oxides formed during frictional contact. It is believed that these lubricious oxides will form also if the heat treated base alloy is subject to temperatures greater than 815.6° C. (1500° F.) for a sufficient time in an oxidizing atmosphere.

16 Claims, 9 Drawing Sheets

U.S. PATENT DOCUMENTS 6,635,355 B2 10/2003 Bianco et al.
6,669,988 B2 12/2003 Daws et al.

OTHER PUBLICATIONS

Efunda Engineering Fundamentals, http://www.efunda.com/materials /alloys/stainless_steels, eFunda: Properties of Stainless Steel 17-4PH, printed Apr. 28, 2004.

MIM Forms LLC, http://www.mimforms.com/pages/17-4ph.html, 17-4PH Stainless Steel, printed Apr. 28, 2004.

Howco Group, http://www.howcogroup.com/guide/002/o_174.htm, Stainless & Duplex 174, printed Apr. 28, 2004.

West Yorkshire Steel Co. Ltd. (U.K.), http://www.westyorkssteel.com/Product_Info/Stainless_Steel/174ph.htm, 17-4PH Precipitation Hardening Steel F520B stocked at West Yorkshire Steel, printed Apr. 28, 2004.

Sandmeyer Steel Company (Philadelphia, PA), Specification Sheet: 17-4PH (UNS S17400), Jun. 2003.

Corus Engineering Steels, Information Sheet for AMS 5659 (15-5PH), Jun. 2003.

Efunda Engineering Fundamentals, http://www.efunda.com/materials /alloys/stainless_steels, eFunda: Properties of Stainless Steel 15-5PH, printed Apr. 28, 2004.

Metal Suppliers Online, LLC, http://www.suppliersonline.com/propertypages/15-5.asp, 15-5 Stainless Steel Material Properties, printed Apr. 28, 2004.

R. T. Foley, M.B. Peterson, and C. Zapf, *Frictional Characteristics of Cobalt, Nickel, and Iron as Influenced by Their Surface Oxide Films*, ASLE Transactions 6, 1963, pp. 29-39.

E. Rabinowicz, *Lubrication of Metal Surfaces by Oxide Films*, ASLE Transactions 10, 1967, pp. 400-407.

CHROMIUM-NICKEL STAINLESS STEEL ALLOY ARTICLE HAVING OXIDE COATING FORMED FROM THE BASE METAL SUITABLE FOR BRAKE APPARATUS

This invention pertains to chromium-nickel stainless steel alloy articles having an adherent, wear resistant coating of metallic oxides. The invention describes how a layer of iron oxide, chromium, nikel and copper is formed on the surface of the chromium-nickel stainless steel alloy articles, during heat treatment in an oxidizing atmosphere, preferably of air. The iron oxide, chromium, nickel, copper layer is between about 2.5 to about 203 microns (0.1 mil to about 8 mils) thick. This layer provides the underlying bases for the formation of the lubricious oxides during frictional contact. It is believed that these lubricious oxides may also form on chromium-nickel stainless steel alloy articles that had been subjected to a controlled oxidation of the underlying base metal without any frictional interaction provided that the treated article is subject to temperatures greater than 815.6° C. (1500° F.) for a sufficient time in an oxidizing atmosphere. Such articles are useful, inter alia, as torque drive inserts for a friction disk for a multi-disk brake or clutch assembly. A friction brake disk assembly has a plurality of axially aligned annular shaped rotor disks having slots at their outer diameter to engage wheel spline drives and allow for axial movement interleaved with annular stator disks which are slotted at their inner diameter to engage torque tube spline drives and allow for axial movement. Each of the stator disks and the rotor disks has a plurality of circumferentially spaced slots along the periphery, with metallic reinforcing drive inserts therein to transfer the load to the disks. The drive inserts are formed of a chromium-nickel stainless steel alloy such as 17-4PH stainless steel alloy having an adherent coating of metal oxides formed by controlled oxidation of the underlying base metal.

BACKGROUND OF THE INVENTION

Foley et al. disclose the results of their evaluation of the sliding frictional characteristics of cobalt on cobalt, nickel on nickel and iron on iron under different atmospheric conditions over a range of temperatures using a hemispherically shaped pin in continuous sliding contact at 3.63 m./min. on a rotating disk (R. T. Foley, M. B. Peterson, and C. Zapf, *Frictional Characteristics of Cobalt, Nickel, and Iron as Influenced by Their Surface Oxide Films*, ASLE Transactions 6, 1963, pp. 29-39). Although considerable data is presented that indicates that behavior varies widely among these different metals as the temperature and the atmosphere change, no guidance is given as to the potential behavior of complex systems such as alloyed steels.

Rabinowicz suggests that an oxide film of about 0.01 micron thickness on the base metal is needed to provide effective dry lubrication (E. Rabinowicz, *Lubrication of Metal Surfaces by Oxide Films*, ASLE Transactions 10, 1967, pp. 400-407). Considerable data is presented that indicates that behavior varies widely among different metals including nickel riding on type 303 stainless steel, type 303 stainless steel riding on nickel, nickel riding on nickel, and type 303 stainless steel riding on itself, as the temperature and the atmosphere change.

The surface treatment of metals to prevent corrosion is described in U.S. Pat. No. 4,017,336 to Foroulis. Foroulis describes pretreating the metals in the presence of oxidizers such as air at temperatures in the range of about 537.8-648.9° C. (1000-1200° F.) to form an oxygen barrier to sulfur attack.

A method of forming coatings of co-deposited aluminum oxide and titanium oxide on wear surfaces of substrates such as hardened or treated steel, or cemented carbides is disclosed in U.S. Pat. No. 4,052,530 to Fonzi. According to this patent the coating is formed by simultaneously reacting an aluminum halide gas and a titanium halide gas with water on a surface maintained at a temperature of about 482.2° C. (900° F.) to about 676.7° C. (1250° F.) The coating comprises alpha alumina ($Al_2O_3$) with about 2% to about 10% hexagonal alpha titanium oxide ($Ti_2O_3$) dispersed in the alumina matrix. The Fonzi process requires use of chemical vapor deposition with attendant special process equipment and costs, and may deleteriously affect the morphology of the substrate ferrous alloy due to use of relatively long times at temperatures.

U.S. Pat. No. 6,635,355 to Bianco et al. discloses a ferrous metal article having an adherent wear resistant coating of metallic oxides and a method of forming such a coating on an iron-chrome article. The oxides identified in this patent consist of hematite, magnetite and eskolaite.

This invention relates to chromium-nickel stainless steel alloy articles having a wear resistant coating of metallic oxides that are formed by frictional interaction of the iron oxide, chromium, nickel and copper layer resulting from the controlled oxidation of the base alloy. It is believed that these oxides will also form without any frictional interaction if the heat treated base alloy is subjected to temperatures greater than 815.6° C. (1500° F.) for a sufficient time in an oxidizing atmosphere. This coating of iron oxides, chromium, nickel and copper preferably comprise a coating on chromium-nickel stainless steel alloys of the following general composition expressed in weight percent: C 0.00-0.07, CR 11.0 - 18.0, Ni 3-9.5, Cu 1.5-5.0 with other minor alloying elements possibly present. Other alloying elements may be present. The coating has a thickness of from about 2.5 microns (0.1 mil) to about 203 microns (8 mils), and is formed by exposure of the article to an oxidizinq atmosphere, preferably air, preferably during heat treatment of the article.

The present invention also relates to friction braking systems and more particularly to aircraft friction disks with reinforced peripheral slots for use in multiple disk brakes. In brake assemblies which employ a plurality of brake disks alternately splined to the wheel and axle of an aircraft, it is important to provide specially constructed drive means to reinforce peripheral slots in the disks to relieve the severe stressing that otherwise would rapidly deteriorate the periphery of the disks. When disk brakes were constructed of steel, the disks were able to withstand the shearing and compressive forces exerted thereon between the slots and the torque transmitting members because of their physical properties. With the replacement of the steel disks with carbon and/or ceramic composite disks it is important to provide reinforcing drive inserts at the peripheral slots since the composite materials have less durability under this type of loading than steel. The drive inserts transmit the forces to the composite disks, over a larger area reducing the contact stresses which increases the load capability of the composite disks.

The present invention preferably utilizes a torque drive insert such as that described in U.S. Pat. No. 4,469,204. Such drive insert in the peripheral slots engages the composite disk and drives on the rotating member or transfers the stress to the stationary member without deleterious effects on the carbon composite materials. The drive insert has a pair of opposed faces which contact the opposite walls of the slots to distribute the load. The drive insert design uses a channel to retain the drive inserts in position within the slot. Such structure eliminates peeling or fraying of the carbon composite heat sink material while also taking up some of the stresses due to misalignment in the wheel and brake. The structure of the drive insert and clip provides for a large bearing area in the carbon composite and minimizes the weight required to obtain the strength to handle the side loads in case of some misalignment. The construction permits the drive insert to float freely in the slot of the carbon disk thereby eliminating the tension loading of the attaching rivets.

SUMMARY OF THE INVENTION

The present invention comprises a chromium-nickel stainless steel alloy article having a coating of adherent, wear resistant, metallic oxides and a method of forming a coating of adherent, metallic oxides on an article comprising a substrate of chromium-nickel stainless steel alloy. The oxide coating after the controlled oxidation (before frictional interaction) has a thickness of from about 2.5 microns (0.1 mil) to about 203 microns (8 mils), and more preferably is about at least 25.4 microns (1 mil) in thickness. The desired lubricious coating is formed by the frictional interaction of the iron oxide, chromium, nickel and copper in the outer layer resulting from the controlled oxidation of the base alloy. It is also believed that the lubricious oxides will form also without any frictional interaction if the oxidized base alloy is subjected to temperatures greater than 815.6° C. (1500° F.) for a sufficient time in an oxidizing atmosphere.

The present invention also contemplates a friction brake disk type assembly with the disks having flat annular surfaces and a plurality of circumferentially spaced slots along the outer periphery of the rotating disks and slots along the inner periphery of a stationery disk. A torque drive insert is positioned within each slot for contact with either the spline of a torque device in the case of the rotating disk or with key members that are fixedly secured to a stationary torque tube. The drive inserts are U-shaped with each leg having a pair of side portions that extend away from the slots along the flat annular surface of the disk but not limited to this insert configuration. Clips are fixedly secured to the disks and retain the drive inserts within their slots permitting a slight degree of movement because of a clearance space between the clips and the drive inserts. Certain surfaces of the drive insert are subjected to sliding frictional contact with their associated confronting surfaces of the associated torque drive member, e.g. of an aircraft wheel as the loaded wheel rotates. A multi-disk brake provided with drive inserts formed of oxide-coated 17-4PH stainless steel alloy provides increased stability against vibration during a braking event compared to an otherwise identical brake having a brake stack in which all of the drive insert are formed of SAE AMS 5385 cobalt-base alloy which is commercially available as Stellite™ 21 alloy from The Haynes Stellite Co., Kokomo, Ind. or Stoody Deloro Stellite, Inc., St. Louis, Mo.

DESCRIPTION OF THE PREFERRED EMBODIMENT

A chromium-nickel stainless steel alloy article having a coating of adherent, wear resistant, metallic oxides and a method of forming a coating of adherent, metallic oxides on an article comprising a substrate of chromium-nickel stainless steel alloy is described. The coating after the controlled oxidation of the base metal alloy has a thickness of from about 2.5 microns (0.1 mil) to about 203 microns (8 mils), and more preferably is at least about 25.5 microns (1 mil) in thickness. The lubricious coating is then formed by the frictional interaction of the iron oxide, chromium, nickel and copper layer resulting from the controlled oxidation of the base alloy. It is believed that this lubricious coating may also be formed without any frictional interaction, if the oxidized article is subject to temperatures greater than 815.6° C. (1500° F.) for a sufficient time in an oxidizing atmosphere.

For chromium-nickel stainless steel alloys, such as 17-4PH, the desired surface iron oxide, chromium, nickel and copper coating is formed at temperatures above about 1000° C. (1 832° F.). In the case of 17-4PH stainless steel alloy, that time needed to produce the desired surface iron oxide is primarily based on solution treatment requirements. Use of a temperature greater than 1051.67° C. (1925° F.) increases the rate of surface iron oxide formation, however this would not be done as it may negatively affect the metallurgical and mechanical properties of the base metal. Excessive surface iron oxide coating formation is undesirable because the resulting coating is likely to spall during cooling of the article from the heat treatment temperatures. If the oxide coating is excessively thick, severe spalling may occur since extreme thermally induced mechanical stresses arise as the temperature is changed from that at which the oxides were formed. Insufficient surface iron oxide coating formation will result in reduced formation of lubricious oxide coating during frictional interaction of the iron oxide, chromium, nickel and copper layer resulting from the controlled oxidation of the base alloy, and degradation of the tribological performance of the articles.

Preferably, the heat treatment process used to obtain the desired surface iron oxide coating on the chromium-nickel stainless steel alloy such as 17-4PH stainless steel alloy article include the following steps. First, the article is heated in flowing air for approximately two hours at around 1038° C. (1900° F. ±25° F.) in a furnace with an air flow of 10-30 cubic feet per hour. The article is then quenched in an industrial grade oil quenchant. Any other quenching agents can be used provided they match the cooling rate of the oil quenchant. The article is then aged by heat treating in a furnace in the range of about 593° C. (1100° F. ±25° F.) for approximately four hours with an air flow of 10-30 cubic feet per minute. All hold times listed above are counted from when the article being heat treated is isothermal within the temperature range listed. The article is then air cooled to room temperature.

Experimentation established that a change of 38° C. (100° F.) has an influence on the thickness of the iron oxide, chromium, nickel and copper layer in the range of heat treatment times considered. Changing the oxidation temperature has more influence on the amount of iron oxide, chromium, nickel and copper layer formed than changing the time of exposure the same fractional amount of the base value.

The oxides of the oxidized 17-4PH stainless steel alloy article in the as heat treated condition and after frictional interaction according to this invention were examined. The surface oxides, compounds and elements listed in Table 1A and 1B below were found using X-ray diffraction with graphite monochromated copper K-alpha radiation on a computer controlled Bragg-Brentano focusing geometry horizontal diffractometer. As set forth in Tables 1A and 1B, major phases are compounds that produce diffraction peaks with an integrated intensity of at least 50% of the strongest peak in the sample. Minor phases are compounds with peaks within 5 to 50% of the strongest peak.

TABLE 1A

SURFACE IRON OXIDES OF THE AS HEAT TREATED 17-4PH STAINLESS STEEL ALLOY

| Phases | Chemical Formula | Structure | Relative Abundance |
|---|---|---|---|
| Hematite | $Fe_2O_3$ | Rhombohedral | Minor to Major |
| Magnetite | $Fe_3O_4$ | Cubic | Major |
| Maghemite-Q | $Fe_2O_3$ | Tetragonal | Minor |
| Chromium-Iron-Nickel Metallic | $Cr_{0.19}Fe_{0.7}Ni_{0.11}$ | Cubic | Minor |

TABLE 1B

OXIDE COMPOUND AND ELEMENTS OF 17-4PH STAINLESS STEEL ALLOY AFTER FRICTIONAL INTERACTION

| Phases | Chemical Formula | Structure | Relative Abundance |
|---|---|---|---|
| Magnetite | $Fe_3O_4$ | Cubic | Major |
| Trevorite | $NiFe_2O_4$ | Cubic | Major |
| Chromium-Iron-Nickel Metallic | $Cr_{0.19}Fe_{0.7}Ni_{0.11}$ | Cubic | Major to minor |
| Iron | Fe | Cubic | Major to minor |
| Maghemite-Q | $Fe_2O_3$ | Tetragonal | Minor |
| Hematite | $Fe_2O_3$ | Rhombohedral | Minor |
| Eskolaite | $Cr_2O_3$ | Rhombohedral | Minor |
| Chromium Oxide | $Cr_5O_{12}$ | Orthorhombic | Minor |
| Tenorite | CuO | Monoclinic | Minor |

The oxides formed on the surface of the base metal after heat treatment according to this invention comprise $Fe_3O_4$ and $Fe_2O_3$ are summarized in Table 1A. The desired lubricious oxides formed after frictional interaction are summarized in Table 1B.

Any chromium-nickel stainless steel alloy can be used in the present invention as the underlying base metal alloy to form the desired lubricious oxides. These desired lubricious oxides listed in Table 1B are formed by the frictional interaction of the iron oxide, chromium, nickel and copper layer formed during controlled oxidation of the base alloy (as listed in Table 1A). It is also believed that these lubricious oxides will form without any frictional interaction if the oxidized base alloy is subject to temperatures greater than 815.6° C. (1500° F.) for a sufficient time in an oxidizing atmosphere.

Preferably, 17-4PH stainless steel alloy is used as the base alloy. 17-4PH stainless steel alloy is a type of precipitation-hardenable stainless steel. The chemistry of 17-4PH stainless steel alloy is listed below in Table 2. Other chromium-nickel stainless steel alloys, including but not limited to 15-5PH, 17-7PH, and Custom455 will form the iron oxide, chromium, nickel and copper layer during heat treatment in an oxidizing atmosphere, preferably air, and create the condition which will allow for the formation of desired lubricious oxides during frictional interaction. It is believed that the desired lubricious oxides will also form without any frictional interaction if the heat treated base alloy is subject to temperatures greater than 815.6° C. (1500° F.) for a sufficient time in an oxidizing atmosphere.

The elements believed to be important to the formation of these lubricious oxides are Ni, Fe, O, Cr, Cu.

TABLE 2

CAST 17-4PH CHEMISTRY

| Element | Min. wt. % | Max. wt. % |
|---|---|---|
| C | — | 0.060 |
| P | — | 0.025 |
| S | — | 0.025 |
| Si | 0.50 | 1.00 |
| Mn | — | 0.70 |
| Al | — | 0.05 |
| Cr | 15.50 | 16.70 |
| Ni | 3.600 | 4.60 |
| Nb | 0.15 | 0.40 |
| Cu | 2.80 | 3.50 |
| Ta | — | 0.05 |
| Sn | — | 0.02 |
| N | — | 0.05 |
| Fe | Balance | Balance |

Source for standard cast chemistry of 17-4PH: SAE AMS 5355; ACI CB-7Cu-1 and UNS J92200.

In addition to the cast 17-4PH, wrought 17-4PH has a modified chemistry suited to wrought alloys when processed according to this invention, therefore, it is believed that the same lubricious oxides should be formed upon frictional interaction of the oxidized base metal. Similarly, the other chromium-nickel stainless steel alloys have the elements which will allow for the production of lubricious coatings when processed per this invention. In particular the preferred range of Cr is 11-18 weight percent, Ni is 3.0-9.5 weight percent and Cu is 1.5-5.0 weight percent. Other key elements which could be important to formation of lubricious oxides in other stainless steel alloys are copper, molybdenum, titanium, silicon, niobium, tantalum and aluminum.

Figure 3:
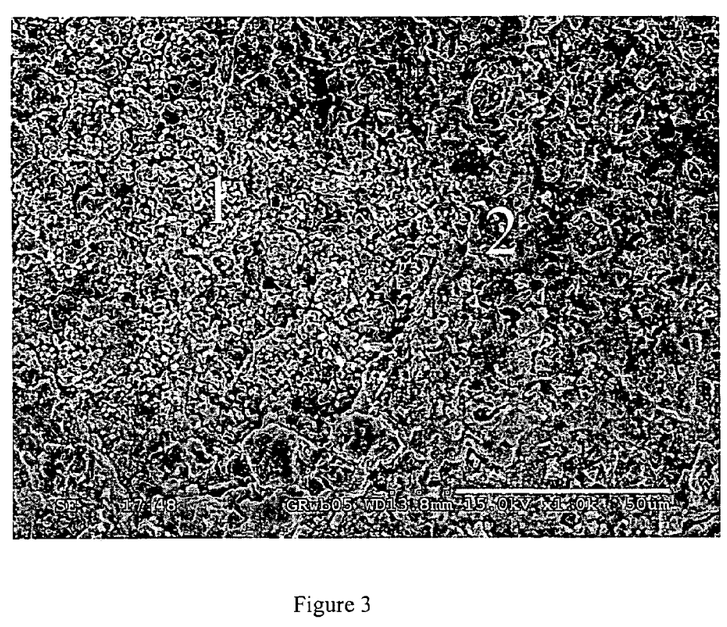
FIG. 3 is a secondary electron photograph of the iron oxide surface after heat treatment of a chromium-nickel stainless steel alloy article according to the invention[1000×].

Referring to FIG. 3, there is shown a specimen taken from a cast article formed of 17-4PH stainless steel alloy that was processed using the heat treatment described above. FIG. 3 is a Secondary Electron Image of the surface view of the article showing the surface morphology. The cast article has been processed according to the invention to form the surface iron oxide, chromium, nickel and copper layer. As illustrated in FIG. 3, two distinct regions of oxide can be seen: Region 1 and Region 2. The majority of the oxide surface consists of the morphology shown in Region 1.

Figure 4A:
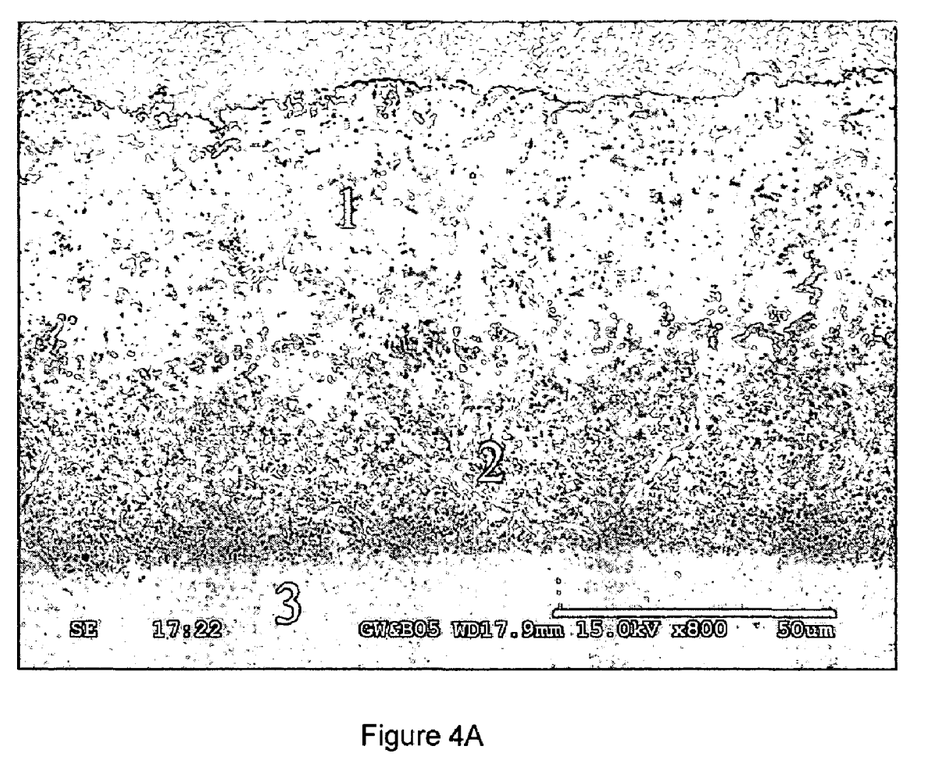
FIG. 4A is a secondary electron photograph at 800× of the cross section of the coating depicting the iron oxides, chromium, nickel, copper coating after the controlled oxidation of the underlying base metal alloy.
Figure 4B:
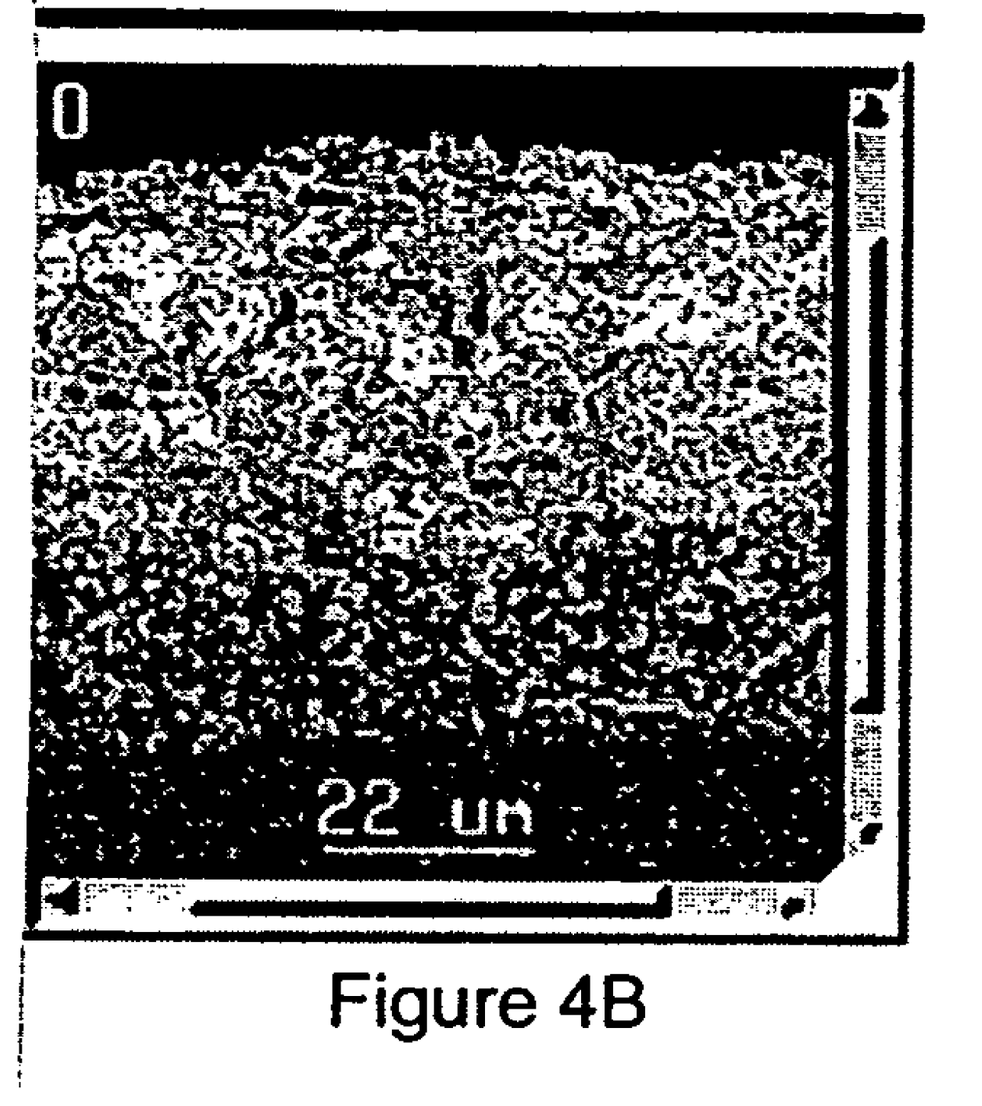
FIG. 4B is an EDS (Energy Dispersive Spectroscopy) elemental image photograph corresponding to FIG. 4A at a reduced scale and depicting the oxygen content of the coating after the controlled oxidation of the underlying base metal alloy after heat treatment.
Figure 4C:
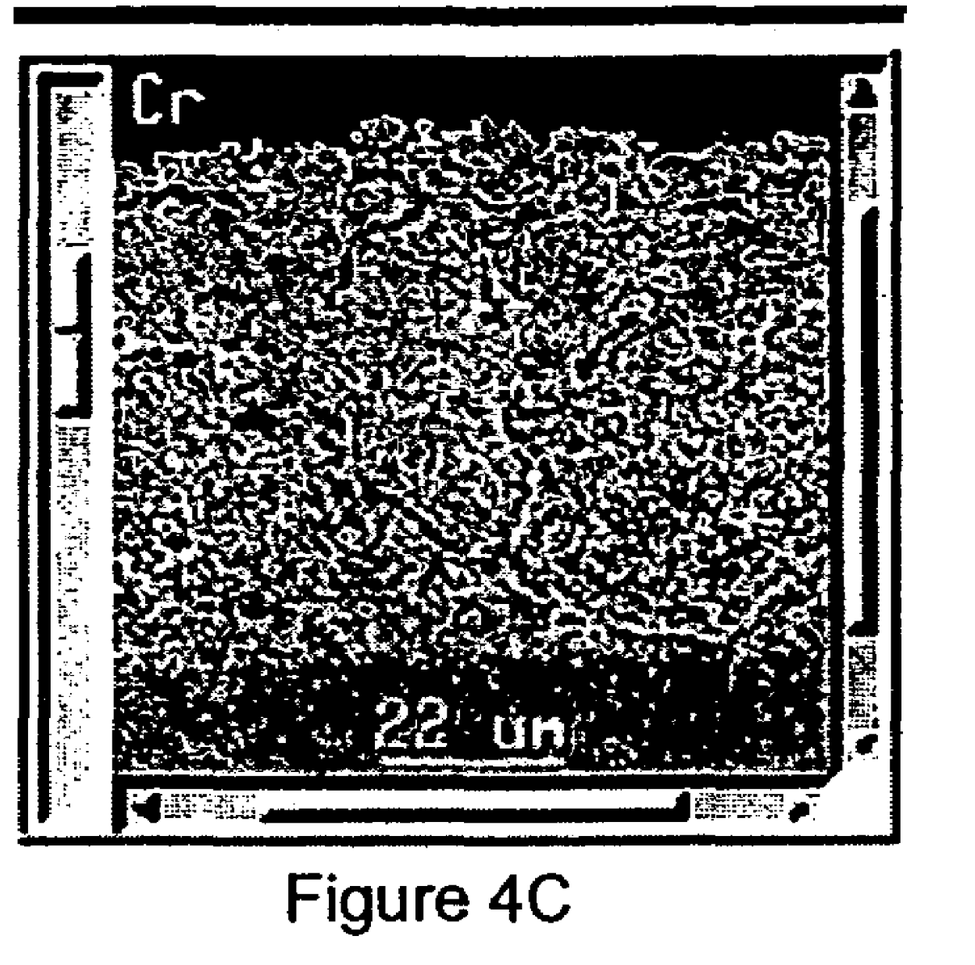
FIG. 4C is an EDS (Energy Dispersive Spectroscopy) elemental image photograph corresponding to FIG. 4A at a reduced scale and depicting the chromium content of the coating after the controlled oxidation of the underlying base metal alloy.
Figure 4D:
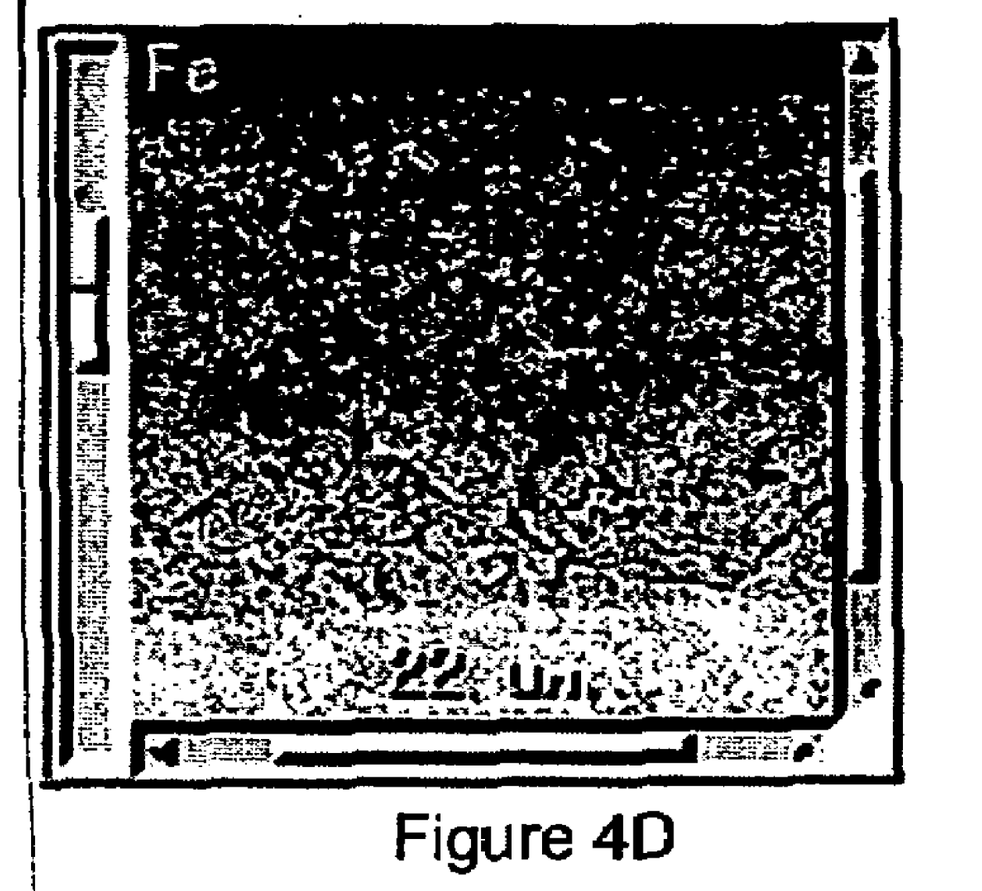
FIG. 4D is an EDS (Energy Dispersive Spectroscopy) elemental image photograph corresponding to FIG. 4A at a reduced scale and depicting the iron content of the coating after the controlled oxidation of the underlying base metal alloy.
Figure 4E:
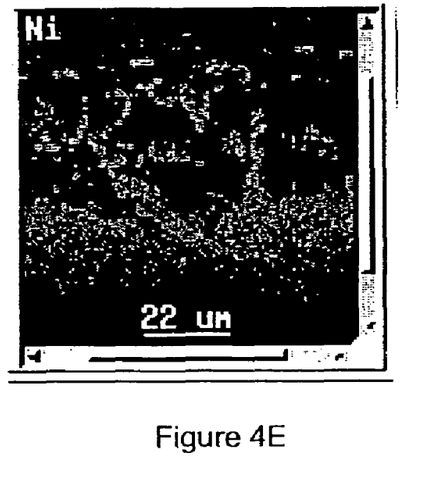
FIG. 4E is an EDS (Energy Dispersive Spectroscopy) elemental image photograph corresponding to FIG. 4A at a reduced scale and depicting the nickel content of the coating after the controlled oxidation of the underlying base metal alloy.
Figure 4F:
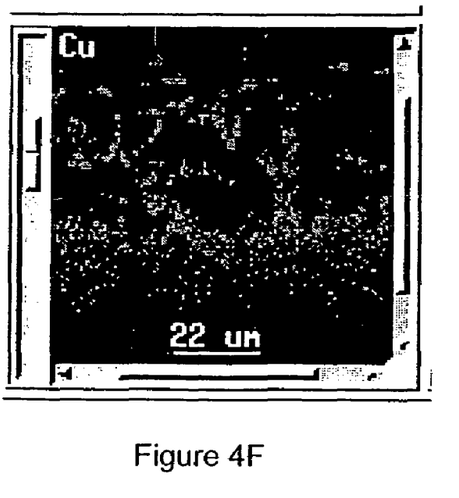
FIG. 4F is an EDS (Energy Dispersive Spectroscopy) elemental image photograph corresponding to FIG. 4A at a reduced scale and depicting the copper content of the coating after the controlled oxidation of the underlying base metal alloy.
Figure 4G:
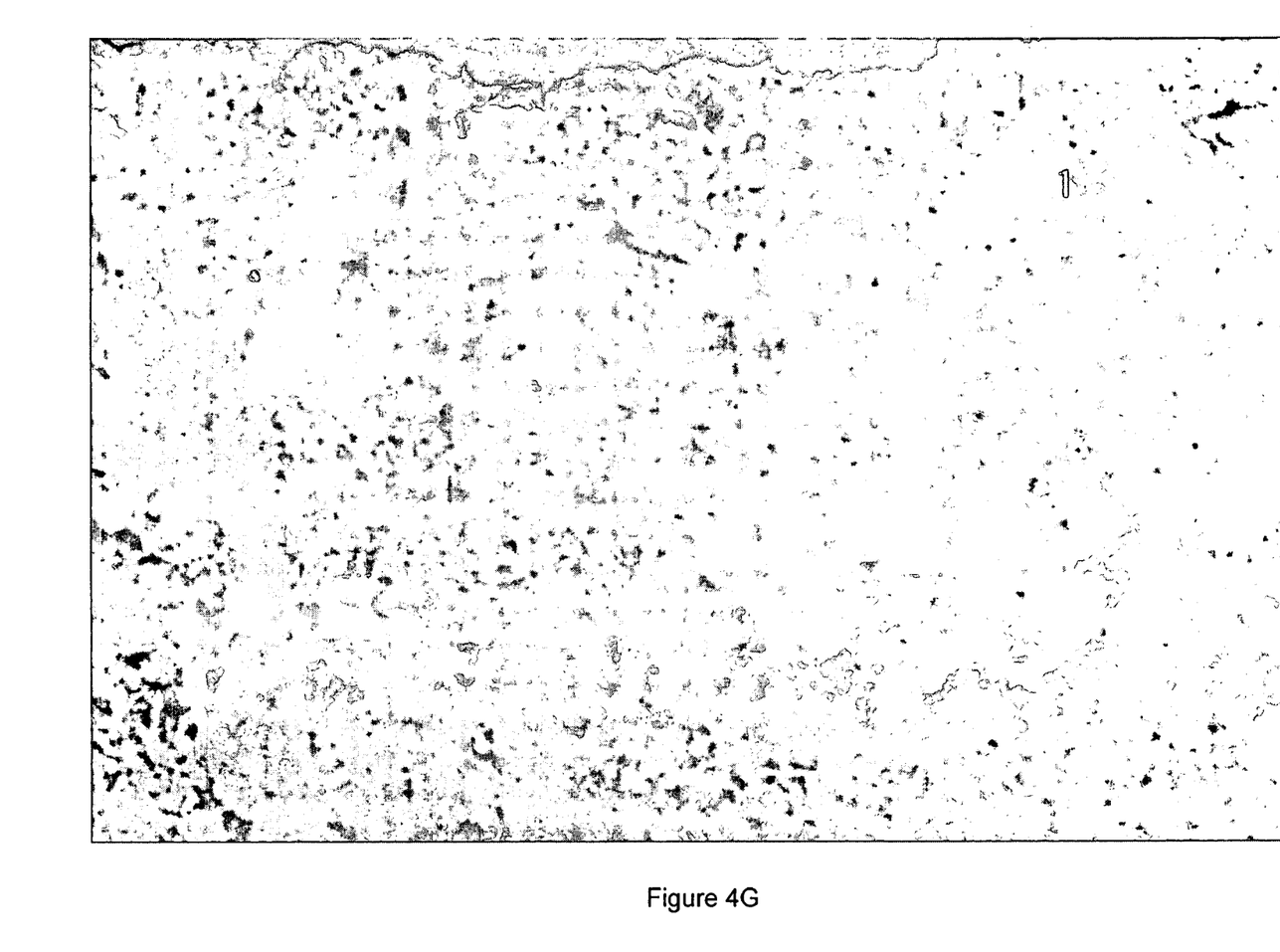
FIG. 4G is a secondary electron photograph at 800× digitally enlarged 45% from the original image and is a cross section of the oxide layer of the coating after the controlled oxidation of the underlying base metal alloy.

FIG. 4A shows a secondary electron photograph image of the cross section of the article showing surface iron oxide, chromium, nickel and copper layer after controlled oxidation and prior to any frictional interaction. The total thickness of the coating is preferably about 25 to 102 microns (1-4 mils). The outer layer is a predominantly $Fe_2O_3$ and $Fe_3O_4$ with some amounts of Fe—Cr—Ni—Cu rich islands that x-ray retraction identified as metallic phase in the form of small islands as shown in FIG. 4G Region 1. The internal oxide in Region 2 of FIG. 4A is Cr rich.

Figure 5:
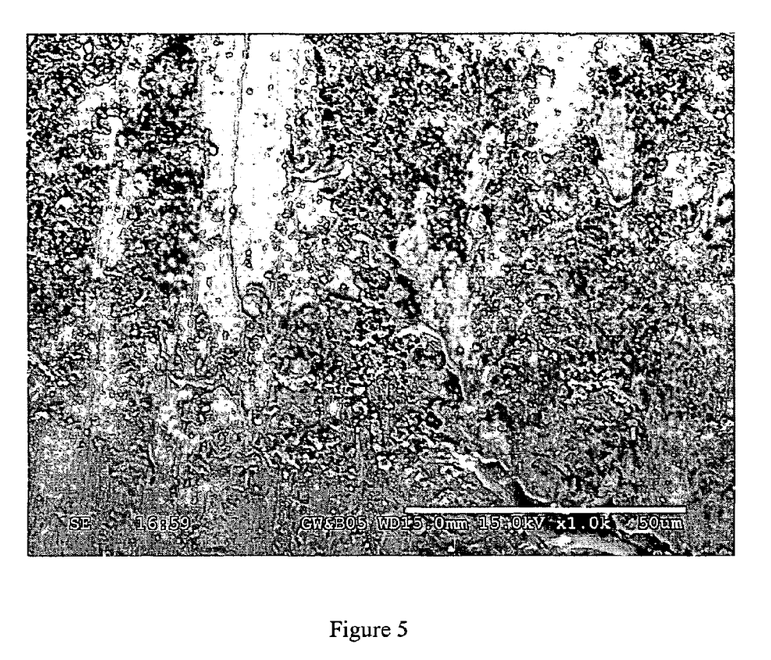
FIG. 5 illustrates a secondary electron photograph of the surface oxides compound and elements after frictional interaction creating the preferred lubricious surface oxides.

FIG. 5 illustrates a secondary electron photograph of the surface oxides compound and elements after frictional interaction creating the preferred lubricious surface oxides.

Figure 1:
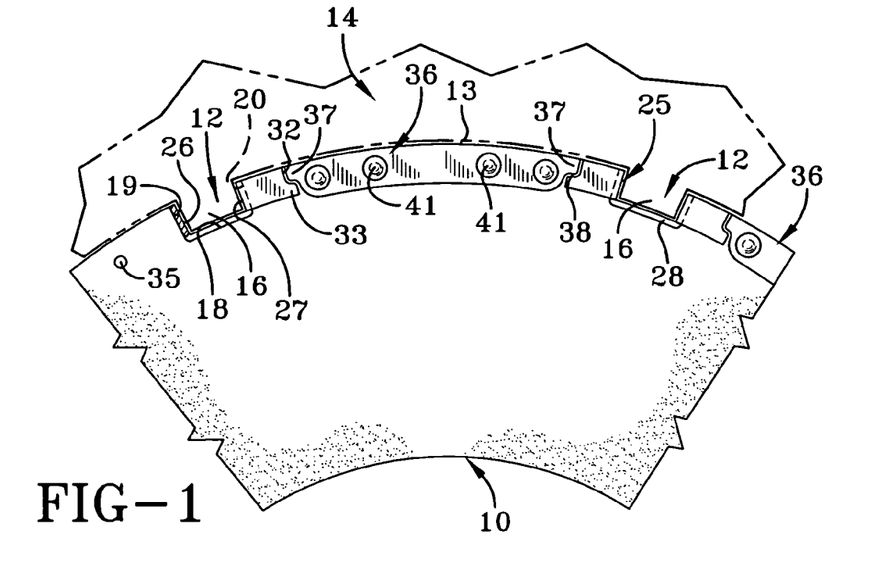
FIG. 1 is a fragmentary side elevational view of a brake disk assembly with a key slot and torque drive insert secured to the respective peripheral slots by clips.
Figure 2:
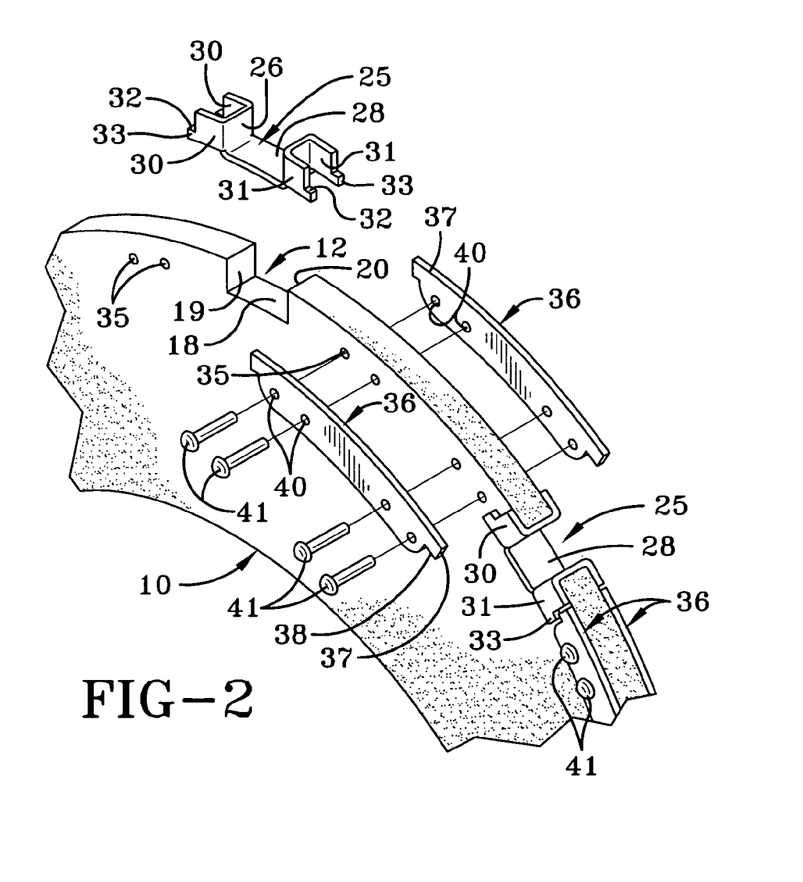
FIG. 2 is an exploded perspective view of the torque drive insert and clip in relation to a perspective view of a fragmentary portion of a rotor brake disk.

This invention also relates to the use of the chromium-nickel stainless steel alloy in various components of aircraft friction braking systems. Referring to the drawings, wherein like reference numerals designate like or corresponding parts throughout the several views, there is shown in FIG. 1, a friction brake disk 10 in the form of a rotor of a multiple disk aircraft brake. Although only a portion of one rotor disk is shown, it is understood that "multiple disks" refers to the plurality of axially spaced-apart annular rotor disks which are suitably splined for axial movement along a mating key or spline 16 (shown in ghost lines) that is part of or is attached to the rotating wheel. The plurality of annular rotors are interleaved with annular stator disks which in turn are suitably splined for axial movement along a mating key member (or members) that is fixedly secured to a torque tube (not shown). Disk 10 is an annular member having flat annular wall surfaces with an inner and an outer periphery. As seen in FIGS. 1 and 2, disk 10 has a plurality of circumferentially spaced slots 12 along its outer periphery 13.

The disk 10 is fabricated from a suitable friction material such as a carbon-fiber composite in a known manner such as those described in U.S. Pat. Nos. 3,657,061 to Carlson; 4,790,052 to Olry; 5,217,770 to Morris et al.; 5,480,678 to Rudolf et al.; 5,546,880 to Ronyak et al.; 5,662,855 to Liew et al. and 6,669,988 to Daws et al. but not limited thereto. Many processes for making suitable carbon-carbon composite disks are well known in the art and therefore will not be described herein.

A torque device 14 (shown in phantom lines in FIG. 1) is located adjacent to the outer periphery of the disks 10 (only a portion of one shown in FIG. 1). Torque device 14 has a plurality of splines, ribs or disk engaging members 16 projecting into slots 12 to provide a means for applying a load or force on the disk 10 by its engagement with slot 12. Slot 12 has a bottom surface 18, and two radially extending planar side walls 19 and 20. The torque device may be a wheel provided with splines, ribs or disk engaging members 16.

A metal torque drive insert 25 (FIG. 2) is located within each slot 12 to provide a reinforcement means for driving contact from the splines 16 of torque device 14. Each insert has a generally U-shaped configuration, with a pair of end sections 26 and 27 which are adapted to engage the planar side walls 19 and 20 of slot 12 such that the forces applied to the end sections 26 and 27 transfer the forces to the planar side walls 19 and 20. The end sections 26 and 27 are interconnected by a bridging section 28. The bottom surface of the bridging section 28 is in abutting contact with the bottom surface 18 of slot 12. The respective end sections 26 and 27 have a pair of arms 30 and 31 that extend outwardly away from the bridging section 28. Each of the arms 30 and 31 is notched at its upper outermost corner thereby presenting a shoulder 32 and an abutment 33. The pairs of arms 30 and 31 extend in opposite directions and are substantially parallel and lightly contact the outer peripheral annular surface of disk 10. Each pair of arms 30 and 31 straddle the periphery 13 of the disk. The outer periphery of disk 10 contains a pair of bores 35 to either side of each slot 12. Since the pairs of arms 30 and 31 of drive insert 25 extend along the periphery 13 of the disk 10, the pairs of bores 35 are located along the periphery but beyond the respective edges of the arms 30 and 31.

The torque drive inserts 25 are retained within their respective slots via clips 36. Each clip 36 is an elongated member with a recessed or reduced end defining an abutment 37 which forms a shoulder which can frictionally abut shoulder 32 of insert 25. By reducing the width of clip 36 adjacent abutment 37, a recess 38 is formed such as to receive the abutment 33 of insert 25, while the abutment 37 enters the notched upper outermost corner of the adjacent arms 30 or 31 so that the abutment 37 can frictionally abut the shoulder 32 of such arms. Each clip 36 has a pair of openings 40 which are spaced the same distance as the pairs of bores 35 along the periphery of disk 10. On aligning the openings 40 with bores 35, the clips 36 can be rigidly secured to the periphery of disk 10 by rivets 41 extending through the respective openings and bores. The clips may be formed of a metal alloy that is the same as or different from that used to form the drive inserts.

In a preferred embodiment, multiple disk brakes, the splines 16 of torque device 14 extend into the slots 12 of the axially aligned rotor brake disks 10. The respective slots 12 receive the drive inserts 25 such that the respective clips 36 to either side of any drive insert 25 will retain the insert 25 within the slot since the respective abutments 37 of clip 36 overlie the abutment 33 of insert 25. The shoulder 32 formed by the recess in the arms 30-31 of insert 25 thus can abuttingly contact the surface or edge of the abutment 37 of clip 36. This design permits the insert 25 to float freely in the slot 12 of the carbon disk 10 eliminating any tension thereon that otherwise would occur if insert 25 were firmly riveted to the disk 10. By permitting the floating of insert 25, the respective planar surfaces of the end sections 26 or 27 will fully contact the side walls 19 and 20 of the slot 12 in disk 10.

Stator disks (not illustrated) can also be provided with similar torque transmitting drive inserts in a manner similar to those used in the rotor disk 10 described above. Each stator disk includes drive slots spaced around its inner periphery. A single clip can engage and retain opposite portions of two adjacent drive inserts. Clips are mounted on both sides of the flat annular surface of the disks.

In the operation of the disks 10 in multiple disk brakes, the splines 16 of torque device 14 extend into slots 12 of the axially aligned rotor brake disks 10. The axially aligned stators interleaved between the annular axially aligned and axially spaced rotor disks 10 are suitably splined for axial movement along a mating key member that is fixedly secured to a stationary torque tube and is subject to being moved axially by suitable actuators such as a piston. When the brakes are applied, the rotor disks 10 and the stator disks are axially squeezed together. The frictional forces between the faces of the rotor disks and the stator disks creates a load at the slots 12 as they bear against the splines 16 and the mating key members of the stationary brake disks. This load is transmitted to the sides or legs of the U-shaped drive inserts 25, which via their flat faces exert a force directly on the appropriate walls of slots 12. No torque load is transmitted from the drive inserts 12 to the clips or their rivets but rather distributed evenly over the flat wall surfaces of the slots of the carbon disks. When the torque load is transmitted from the drive inserts to the faces of the slots in the disks, the drive inserts seat firmly against the carbon disks. During operation, the wear faces of radially extending end sections 26, 27 of the drive inserts 25 are in frictional engagement with their corresponding confronting faces of splines 16 of torque device 14. And during operation, the wear faces of radially extending end sections of the stator disk drive inserts are in frictional engagement with their corresponding confronting faces of ribs of the torque tube (not shown).

In operation, the drive inserts are subjected to sliding frictional contact due to engagement with the confronting surfaces of the associated splines 16 of the torque device 14 and ribs of the torque tube. In the case of an aircraft wheel and brake assembly, deflection of the torque device as it is rotated under load in service exacerbates such sliding frictional contact. Also, in such aircraft brake applications, operating temperatures in normal service landings and stops of the aircraft are in the range of 300 to 480° C. (572-896° F.). For this reason the drive inserts and the associated spline members have been made of high service temperature, wear resistant materials, e.g. Stellite™ 21 cobalt-base alloy for the drive inserts and Incone™ IN 100 for the spline members, the latter additionally being provided with a wear resistant coating such as hard chrome electroplate or flame-sprayed tungsten carbide/cobalt (WC/Co) material, Inconel™ IN 100 is a nickel base alloy available from International Nickel Company, Huntington, W. Va.

Preferably, the torque drive inserts 25 are preferably formed of a chromium-nickel stainless steel alloy such as 17-4PH which has been intentionally subjected to an oxidizing step as a part of heat treatment of the inserts. The drive inserts are preferably formed by investment casting, which averts the need for subsequent machining as is typically required if other methods such as forging are used. The drive inserts can also be formed by machining from wrought stock.

EXAMPLE 1

The sliding frictional characteristics of various combinations of materials in conjunction with articles made from chromium-nickel stainless steel alloys according to the this present invention are summarized in Tables 3-6. Pins of 17-4PH material according to the present invention (17-4PH OX HT) were treated to form the desired adherent oxides layer and also tested to determine friction and wear characteristics in sliding contact with flat metal plates that were coated to correspond to the coating on the brake drive splines. In ones series of experiments, the flat metal plates were formed with Inconel 100 that was flame sprayed with tungsten carbide/cobalt material (WC/Co) commercially available from White Engineering Surfaces Corporation, Philadelphia, Pa. In another series of experiments, Inconel™ 100 that was coated with electroplated chromium from Armaloy of Ohio Inc., Springfield, Ohio. The 17-4PH heat treated pins were compared to bare cast Stellite 21 and A286 cast pins. The A286 cast pins were subject to a heat treatment method as described in U.S. Pat. No. 6,635,355 ('355 Patent), incorporated by reference herein in its entirety. HT # in the Tables below refers to the heat treatment # described in the '355 Patent.

The testing was conducted on a Cameron Plint TE77 High Frequency Friction Machine per ASTM G 133/95 "Standard Test Method for linearly Reciprocating Ball-on-Flat Sliding Wear" addressing the dry and lubricated wear of ceramics, metals and ceramic composites, under the following conditions: test temperature 22.2° C./315.6° C. (72° F./600° F.); test frequency 30 Hz; test displacement 0.25 inches; test duration 30 minutes and applied load of 2.2 lbs. The Cameron Plint TE77 High Frequency Friction Machine was designed for the evaluation of lubricants and the friction and wear properties of materials in dry and lubricated reciprocating sliding or rolling/sliding contact conditions. The moving specimen (pin) is mounted in a carrier head and loaded against the fixed specimen (plate) by a spring balance through a lever and stirrup mechanism. The normal force is transmitted-directly onto the moving specimen by means of the needle roller cam follower on the carrier head and the running plate on the loading stirrup. A strain gauge transducer is mounted on the lever at a point directly beneath the point of contact and this measures the applied load. The specimen (pin) is oscillated mechanically against the fixed lower specimen (plate). The mechanical drive which consists of an eccentric cam, scotch yoke and plain guide bearings is controlled by a tachometer generator feedback to ensure a stable oscillating frequency to compensate for changing friction conditions and changing temperature due to friction. The fixed specimen (plate) is located on two screw fittings in a stainless steel reservoir. The reservoir is clamped to a block that is heated by four electrical resistance elements. Temperature of the fixed specimen is monitored and controlled to a given set point. The heater block is mounted on two flexures which are stiff in the vertical (loading) direction, but offer small resistance to horizontal forces. Movement in the horizontal direction is resisted by a stiff piezo-electric force transducer and this measures the friction forces in the oscillating contact. A Cameron Plint apparatus is available at the NASA Glenn Research Center, Cleveland, Ohio.

The results of sliding-friction-and-wear testing confirmed the self-forming nature of the desired adherent oxides layer on the chromium-nickel stainless steel alloy, as the pin heads became worn from their initial rounded configuration to one having a flattened end due to contact with the plate. The observed coefficient of friction remained essentially constant throughout the testing.

TABLE 3

AVERAGE VALUES
Wear Rate (in./hr) Drive Insert Materials vs Tungsten Carbide
Cobalt Thermal Spray Coated IN100 plates

| Temp (° C.) | Bare Cast Stellite21 | A286 OX CAST HT 7 | 17-4PH OX HT |
|---|---|---|---|
| 22 | 0.028 | 0.053 | 0.015 |
| 315 | 0.025 | 0.014 | 0.009 |

TABLE 4

AVERAGE VALUES
Coefficient of Friction Drive Insert Materials vs Tungsten
Carbide Cobalt Thermal Spray Coated IN100 plates

| Temp (° C.) | Bare Cast Stellite21 | A286 CAST HT 7 | 17-4PH OX HT |
|---|---|---|---|
| 22 | 0.679 | 0.494 | 0.527 |
| 315 | 0.706 | 0.579 | 0.444 |

These results in Tables 3 and 4 indicate that 17-4PH material treated according to the present invention has a friction and wear advantage compared to the Stellite 21 and A286 materials when run against tungsten carbide cobalt coatings at either low test temperatures or test temperatures typical of carbon brake service 315.6° C. (600° F.).

TABLE 5

AVERAGE VALUES
Wear Rate (in./hr) Drive Insert Materials vs Hard
Chromium Coating on IN100 plates

| Temp (° C.) | Bare Cast Stellite21 | A286 OX CAST HT 3 | 17-4PH OX HT |
|---|---|---|---|
| 22 | 0.0064 | 0.0464 | 0.0564 |
| 315 | 0.0046 | 0.0200 | 0.0207 |

TABLE 6

AVERAGE VALUES
Coefficient of Friction Drive Insert Materials vs Hard
Chromium Coating on IN100 plates

| Temp (° C.) | Bare Cast Stellite21 | A286 CAST HT 3 | 17-4PH OX HT |
|---|---|---|---|
| 22 | 0.488 | 0.552 | 0.697 |
| 315 | 0.323 | 0.564 | 0.407 |

The data in Tables 5 and 6 shows that the 17-4PH material treated according to the present invention offers similar friction and wear performance when compared to the A286 material when run against hard chrome coatings at lower temperatures; the advantage shifts to 17-4PH material at higher temperatures.

Various modifications are contemplated and may obviously be resorted to by those skilled in the art without departing from the described inventions as hereinafter defined by the appended claims, as only a preferred embodiment thereof has been defined.

What is claimed is:

1. A component for an aircraft brake assembly, the component comprising:
   a) a substrate of 17-4PH OX HT alloy having a wear surface; and
   b) an adherent coating of lubricious oxides comprising copper oxide, chromium oxides, and iron oxides, wherein the coating is formed from a base layer of iron oxide, chromium, nickel, and copper on the surface of the alloy, the base layer formed by heating a 17-4PH stainless steel alloy in flowing air for about two hours at about 1875° F. to 1925° F. with an air flow of about 10-30 cubic feet per hour, wherein the 17-4PH stainless steel alloy has the following composition

| CHEMISTRY | | |
|---|---|---|
| Element | Min. wt. % | Max. wt. % |
| C | — | 0.060 |
| P | — | 0.025 |
| S | — | 0.025 |
| Si | 0.50 | 1.00 |
| Mn | — | 0.70 |
| Al | — | 0.05 |
| Cr | 15.50 | 16.70 |
| Ni | 3.600 | 4.60 |
| Nb | 0.15 | 0.40 |
| Cu | 2.80 | 3.50 |
| Ta | — | 0.05 |
| Sn | — | 0.02 |
| N | — | 0.05 |
| Fe | Balance | Balance | and further comprising a chromium-iron-nickel metallic phase.

2. The component of claim 1 wherein the coating is formed upon oxidation of the surface 3. The component of claim 2 in the form of a drive insert for a friction disk.

4. The component of claim 1 wherein the coating comprises oxides of Fe and a $Cr_{0.19}Fe_{0.7}Ni_{0.11}$ Phase.

5. The component of claim 4 in the form of a drive insert for a friction disk.

6. The component of claim 1 wherein the coating is self healing during sliding frictional engagement of the coated surface of the article with one of a hard chromium surface and a flame sprayed WC / Co composite alloy surface.

7. The component of claim 6 in the form of a drive insert for a friction disk.

8. The component of claim 1 in the form of a drive insert for a friction disk.

9. The component of 1, wherein the coating comprises:

| Phases | Chemical Formula | Structure |
|---|---|---|
| Magnetite | $Fe_3O_4$ | Cubic |
| Trevorite | $NiFe_2O_4$ | Cubic |
| Chromium-Iron-Nickel | $Cr_{0.19}Fe_{0.7}Ni_{0.11}$ | Cubic |
| Iron | Fe | Cubic |
| Maghemite-Q | $Fe_2O_3$ | Tetragonal |
| Hematite | $Fe_2O_3$ | Rhombohedral |
| Eskolaite | $Cr_2O_3$ | Rhombohedral |
| Chromium Oxide | $Cr_5O_{12}$ | Orthorhombic |
| Tenorite | CuO | Monoclinic |

10. The component of claim 1 wherein the component comprises a drive insert that is part of a brake assembly having an increased dynamic stability against vibration during a braking event, as compared to an otherwise identical brake assembly having a drive insert made of an SAE AMS 5385 cobalt-base alloy.

11. The component of claim 1 wherein the coating is formed during frictional engagement with a second surface.

12. A component for an aircraft brake assembly, the component comprising a drive insert comprising:

a) a 17-4PH OX HT alloy having a wear surface and a base layer of iron oxide, chromium, nickel, and copper on the surface of the alloy, wherein the base layer is formed by heating a 7-4PH stainless steel alloy in flowing air for about two hours at about 1875° F. to 1925° F. with an air flow of about 10-30 cubic feet per hour, the 17-4PH stainless steel alloy having the following composition

| CHEMISTRY | | |
|---|---|---|
| Element | Min. wt. % | Max. wt. % |
| C | — | 0.060 |
| P | — | 0.025 |
| S | — | 0.025 |
| Si | 0.50 | 1.00 |
| Mn | — | 0.70 |
| Al | — | 0.05 |
| Cr | 15.50 | 16.70 |
| Ni | 3.600 | 4.60 |
| Nb | 0.15 | 0.40 |
| Cu | 2.80 | 3.50 |
| Ta | — | 0.05 |
| Sn | — | 0.02 |
| N | — | 0.05 |
| Fe | Balance | Balance |

, and wherein an adherent coating of lubricious oxides comprising copper oxide, chromium oxides, and iron oxides is formed upon frictional engagement of the base layer with a second surface, the coating further comprising a chromium-iron-nickel metallic phase.

13. The component of claim 12 wherein the lubricious oxides comprise ferrous oxides.

14. The component of claim 12 wherein the drive insert is part of a brake assembly having an increased dynamic stability against vibration during a braking event, as compared to an otherwise identical brake having a drive insert made of an SAE AMS 5385 cobalt-base alloy.

15. A component for an aircraft brake assembly, the component comprising:

a) a drive insert comprising a 17-4PH OX HT alloy having a wear surface, a chromium-iron-nickel metallic phase, and a base layer of iron oxide, chromium, nickel, and copper on the surface of the alloy, wherein the base layer is formed by heatinci a 17-4PH stainless steel alloy in flowing air for about two hours at about 1875° F. to 1925° F. with an air flow of about 10-30 cubic feet per hour, the 17-4PH stainless steel alloy having the following composition

| CHEMISTRY | | |
|---|---|---|
| Element | Min. wt. % | Max. wt. % |
| C | — | 0.060 |
| P | — | 0.025 |
| S | — | 0.025 |
| Si | 0.50 | 1.00 |
| Mn | — | 0.70 |
| Al | — | 0.05 |
| Cr | 15.50 | 16.70 |
| Ni | 3.600 | 4.60 |
| Nb | 0.15 | 0.40 |
| Cu | 2.80 | 3.50 |
| Ta | — | 0.05 |
| Sn | — | 0.02 |
| N | — | 0.05 |
| Fe | Balance | Balance |

, wherein the base layer forms an adherent coating of lubricious oxides comprising copper oxide, chromium oxides, and iron oxides, upon exposure of the insert to an oxidizing atmosphere at a temperature of greater than 815.6° C. (1500° F.).

16. The component of claim 15 wherein the drive insert is part of an aircraft brake assembly comprising a brake stack having a plurality of interleaved stator and rotor friction disks wherein at least one of the disks in the brake stack includes a plurality of torque drive notches spaced around its periphery.

* * * * *

UNITED STATES PATENT AND TRADEMARK OFFICE
CERTIFICATE OF CORRECTION

PATENT NO.         : 7,442,443 B2
APPLICATION NO.    : 11/141479
DATED              : October 28, 2008
INVENTOR(S)        : John P. Swank, Leslie Steele and Robert Bianco Page 1 of 1

It is certified that error appears in the above-identified patent and that said Letters Patent is hereby corrected as shown below:

Col. 13, Claim 12, line 12, "7-4PH" should read --17-4PH--.

Col. 14, Claim 15, line 7, "heatinci" should read --heating--.

Signed and Sealed this
Twenty-eighth Day of December, 2010

David J. Kappos
*Director of the United States Patent and Trademark Office*